United States Patent [19]
Kenyon et al.

[11] Patent Number: 5,660,052
[45] Date of Patent: *Aug. 26, 1997

[54] APPARATUS AND METHOD FOR DETECTING CHARACTERISTICS OF A WORKING FLUID

[75] Inventors: Richard L. Kenyon, Irvine; Roy M. Yabuki, Los Angeles; Chester D. Campbell, Rancho Santa Margarita; Sandra L. Harper, Dana Point; Michael Nolan, Costa Mesa; Virender Jain, Lake Forest, all of Calif.; Alan Matthies, Milwaukee, Wis.

[73] Assignee: Parker-Hannifin Corporation, Cleveland, Ohio

[*] Notice: The term of this patent shall not extend beyond the expiration date of Pat. No. 5,335,513.

[21] Appl. No.: 460,212

[22] Filed: Jun. 2, 1995

Related U.S. Application Data

[63] Continuation of Ser. No. 182,660, Jan. 18, 1994, which is a continuation-in-part of Ser. No. 6,235, Jan. 19, 1993, Pat. No. 5,335,513.

[51] Int. Cl.$^6$ ........................................ F25B 49/02
[52] U.S. Cl. ........................ 62/228.3; 73/753; 374/16
[58] Field of Search ........................ 62/125, 126, 129, 62/127, 228.3; 374/16, 25; 73/753, 754, 755

[56] References Cited

U.S. PATENT DOCUMENTS

| | | | |
|---|---|---|---|
| 3,059,443 | 10/1962 | Garner | 62/129 X |
| 3,478,534 | 11/1969 | Matthies | 62/225 |
| 3,744,267 | 7/1973 | Norbeck | 62/193 |
| 4,167,858 | 9/1979 | Kojima et al. | 62/126 |
| 4,484,822 | 11/1984 | Hancock | 374/27 |
| 4,646,535 | 3/1987 | Matsuoka et al. | 62/228.5 |
| 4,835,976 | 6/1989 | Torrence | 62/115 |
| 4,841,734 | 6/1989 | Torrence | 62/115 |
| 4,898,476 | 2/1990 | Hermann et al. | 374/28 |
| 4,944,160 | 7/1990 | Malone et al. | 62/180 |
| 4,993,231 | 2/1991 | Torrence et al. | 62/115 |
| 5,000,579 | 3/1991 | Kumada et al. | 374/28 |
| 5,144,814 | 9/1992 | Gaudette | 62/225 |
| 5,335,513 | 8/1994 | Campbell | 62/228.3 |

FOREIGN PATENT DOCUMENTS 2-279966  11/1990  Japan ............... 62/129

OTHER PUBLICATIONS

Langton, "Self–sensing heating elements," Electronics & Wireless World, pp. 606–608.
McAdams, "Heat Transmission," Third Edition, McGraw–Hill Book Company, Inc, 1954, pp. 370–371.
Hand Book of Thermistor Applications, Victory Engineering Corporation, 1968, pp. 1–27.
Decker et al., "Determination of Boiling Point and Boiling Range of Refrigerants," Mar. 1956, pp. 36–40, 100 and 102.
Brady et al., "Measurement of Vapor Pressures by Means of Matched Thermistors," Jan. 23, 1960, pp. 304–311.

*Primary Examiner*—Harry B. Tanner
*Attorney, Agent, or Firm*—Rankin, Hill, Lewis & Clark

[57] ABSTRACT

A heat transfer system includes a high side pressure sensor in the form of a temperature dependent resistance in heat exchange with the system working fluid to locally heat the fluid in response to a control signal. Control means are provided for applying the control signal to the resistance and detecting a minimum thermal resistance between the thermistor and the working fluid.

28 Claims, 4 Drawing Sheets

APPARATUS AND METHOD FOR DETECTING CHARACTERISTICS OF A WORKING FLUID

This is a continuation of application(s) Ser. No. 08/182, 660 filed on Jan. 18, 1994 which is a continuation-in-part of U.S. Ser. No. 08/006,235 filed on Jan. 19, 1993, U.S. Pat. No. 5,335,513.

BACKGROUND OF THE INVENTION

The invention relates generally to heat transfer and refrigeration control systems. More particularly, the invention relates to control devices particularly suited for detecting characteristics, such as pressure, of the working fluid in such systems.

The basic building blocks of all refrigeration and heat transfer systems are well known and include a compressor, a condenser, an expansion means and an evaporator, all of which are connected in a fluid circuit having a working fluid such as halogen containing refrigerants such as chlorofluorocarbons (CFCs), hydrochlorofluorocarbons (HCFCs), hydrofluorocarbons (HFCs), and so forth. In an automotive air conditioning system, for example, the working fluid or refrigerant is typically in heat exchange with the vehicle compartment air by means of the evaporator. The liquid refrigerant turns to gas as it passes through the evaporator or endothermic heat exchanger thus absorbing heat from the ambient air. The gaseous refrigerant leaving the evaporator is drawn into the compressor through a suction line. The compressor pressurizes the gas which then passes through the condenser or exothermic heat exchanger where it is cooled back to a liquid state but is still under pressure. The pressurized liquid refrigerant is then passed through the expansion means, such as a valve, wherein the fluid pressure is adiabatically decreased prior to re-entering the evaporator.

Over the years, many different types of control mechanisms and monitoring devices have been used to regulate the operation of heat transfer or refrigeration systems. One of the more important functions required of a refrigeration control system is to monitor the high refrigerant pressure that exists between the compressor and the inlet port of the expansion means. This is important from a safety consideration to avoid excess pressure in the system. Being able to detect and control the working is important from a safety consideration to avoid excess pressure in the system. Being able to detect and control the working fluid pressure/temperature conditions is also useful for efficient operation of the refrigeration system by controlling subcooling of the pressurized working fluid. In the past, detecting pressure on the system high pressure side between the compressor and the expansion valve has been accomplished by such means as mechanical or electromechanical pressure transducers, pressure or temperature responsive valves, or simpler temperature sensors, the latter being used to approximate pressure based on the ambient temperature of the refrigerant. The mechanically responsive pressure sensors and valves tend to exhibit slow response times to working fluid conditions. More recently, the ready availability of electronic controllers such as microprocessors and other digital/analog controllers has provided the opportunity to electronically control and monitor the operation of the heat transfer system. This has an important benefit of being able to reduce the size and weight of the control system, and more importantly the cost, as well as improving the reliability and flexibility of the control functions.

Although the use of electronic controllers is well known, a suitable electronic pressure sensor has not yet been realized that is low cost but reliable and simple to incorporate into both new refrigeration systems as well as for retrofitting or upgrading older systems. Past efforts, for example, have attempted to use self-heated thermistors to boil the refrigerant and thus determine the saturation temperature or pressure based on the boiling point. This approach is inherently flawed, however, because a thermistor senses its own temperature, not the temperature of the refrigerant within which the thermistor is placed. By allowing the thermistor to self-heat by forcing constant current therethrough, the temperature measurement becomes inaccurate and unreliable. This occurs because the constant current may be greater or lesser than that required to cause boiling due to the variable degree of subcooling of the refrigerant. Not having enough power to cause boiling results in a low reading, whereas using more power than needed to cause boiling results in a high reading. These measurement errors are substantial in typical refrigeration and air conditioning systems because the amount of subcooling varies greatly with environmental conditions. The refrigerant boiling point technique is further flawed by the fact that the controller is only operated on the assumption that the thermistor is actually sensing the saturation temperature (i.e. the boiling point). The thermistor cannot detect the boiling event per se.

Accordingly, the need exists for a simple, reliable and accurate apparatus and method for detecting characteristics of a working fluid in a heat transfer system, particularly as those conditions relate to pressure, in the high pressure regions of the fluid circuit.

SUMMARY OF THE INVENTION

The present invention contemplates apparatus and methods for detecting characteristics of a working fluid for a heat transfer system. In a preferred embodiment of the invention the system includes a temperature dependent electrical resistance element located in a chamber that contains a volume of the working fluid. The chamber receives the working fluid through a small opening that communicates with a flow passage for the working fluid. The volume in the chamber is thus in a quiescent state. The electrical resistance element is in heat exchange relationship with the fluid and causes localized heating of the fluid in response to a control signal. A control means generates the control signal and determines the thermal resistance between the resistance element and the working fluid.

The invention further contemplates the methods associated with the use of such apparatus as well as a preferred method for detecting characteristics of a working fluid. The method includes the steps of disposing a temperature dependent electrical resistance in heat transfer with the fluid, applying a time varying control signal to the resistance sufficient to cause localized heating of the fluid, and detecting the thermal resistance between the electrical resistance and the fluid by detecting power dissipated by the resistance as the fluid is heated.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 3 is a pair of graphs representing a control signal and thermistor current control signal useful with the invention;

DETAILED DESCRIPTION OF THE INVENTION AND PREFERRED EMBODIMENT

Figure 1:
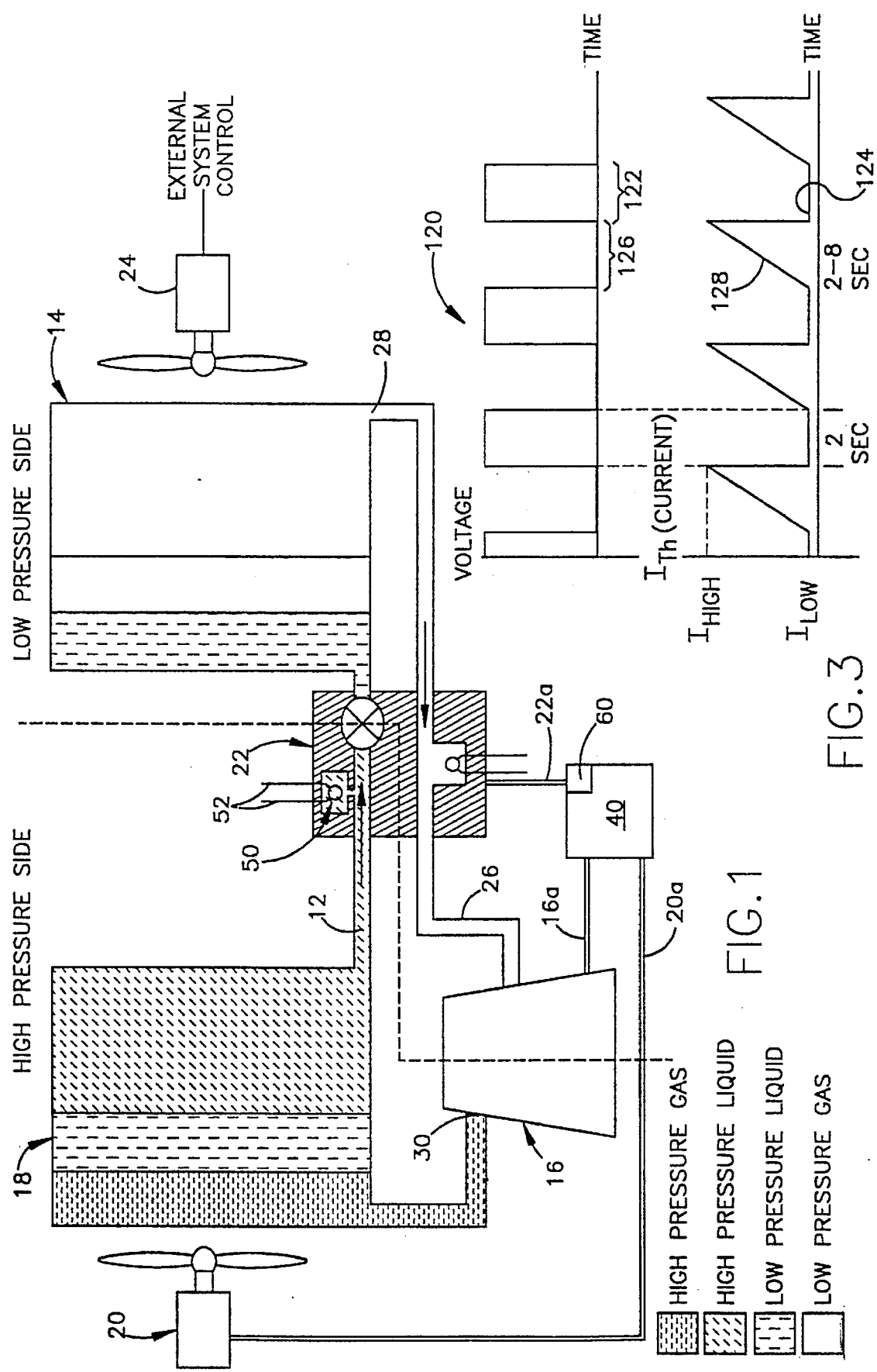
FIG. 1 is a simplified schematic diagram of a heat transfer system suitable for use with the present invention including a sensor according to the invention incorporated therein.

With reference to FIG. 1, we illustrate a heat transfer system generally designated by the numeral 10. For convenience, the invention is described herein in connection with a vehicle air conditioning system such as may be used for cars and trucks. However, this exemplary description is only for convenience and clarity and should not be construed in a limiting sense. For this reason, the heat transfer system components are described in basically generic terms without specific detail because they form no particular part of the invention. The invention is suitable for use with any type of heat transfer system including, but not limited to, commercial refrigeration, heat pump systems, residential air conditioning, industrial air conditioning and so forth. The invention is particularly useful for vehicle air conditioning because of its small size, low cost, low power consumption and fast response to system conditions. Furthermore, the invention is not limited to use with specific working fluids, but can be used to determine characteristics of any fluid compatible with the temperature dependent resistance device. Of particular interest for future refrigeration management systems is that the invention is particularly suited for use with R-134 refrigerant.

As used herein, the terms "working fluid" and "refrigerant" are used interchangeably and in their broadest sense to include any fluid used to effect heating and cooling. Furthermore, the term "heat transfer" and "refrigeration" are not intended to be limiting in any sense, so that it will be understood that the invention can be used with cooling systems, heating systems and systems that interchangeably heat and cool.

In general then, the heat transfer system 10 includes a working fluid 12 such as R-12 or R-134 for example in an interconnected fluid circuit that includes an evaporator 14, a compressor or pump 16, a condenser 18 including a condenser fan 20 and an expansion device 22. The evaporator typically is positioned proximate a fan 24 that blows ambient air, such as passenger compartment air, over cooling fins on the evaporator so that the refrigerant can absorb heat from the ambient air. In FIG. 1 the working fluid is shaded in different ways to illustrate in an exemplary manner the different phases and pressure conditions typical in a heat transfer system 10. The compressor 16 draws gaseous refrigerant through a suction line 26 from the evaporator outlet 28. The compressor raises the operating pressure of the gaseous refrigerant, typically to a pressure of several hundred PSIA. From the compressor outlet 30 the refrigerant flows to the condenser 18 wherein it is cooled to a liquid state. Cooling of the fluid can be regulated by operation of the condenser fan 20. The expansion device 22 is used to regulate the flow of high pressure liquid refrigerant to the evaporator inlet while dropping the pressure of the liquid refrigerant to the operating pressure of the evaporator 14. The expansion device 22 is preferably realized in the form of an expansion valve. However, the invention is not limited to the use of valves as the expansion device.

As the liquid refrigerant passes through the evaporator 14 it absorbs heat from the ambient air and vaporizes or boils off. In a typical heat transfer system, it is desirable that only gaseous refrigerant flow into the compressor from the evaporator. Thus, the refrigerant will typically be in or nearly in a completely vapor state by the time it exits the evaporator. An electronic controller 40 may be used to control operation of the condenser fan 20 using signal lines 20a, to activate and deactivate the compressor motor or clutch (not shown) using signal lines 16a, and to control operation of the expansion valve 22 using signal lines 22a. The operating conditions by which the controller 40 regulates the heat transfer system forms no particular part of the present invention. Typically, the controller will increase flow of refrigerant through the expansion valve as the thermal load increases and decrease the flow when the thermal load decreases. Also, as the pressure increases on the inlet side of the valve 22 the controller may either turn the compressor clutch off, or actuate the condenser fan on and off.

These and other various control functions can be programmed into the controller in a known manner to maintain the operating parameters of the working fluid within predetermined limits. A particularly important parameter to monitor is the working fluid pressure on the high pressure side of the system 10, such as between the condenser outlet and the valve 22 inlet. The present invention provides a sensor and method for detecting pressure conditions of the working fluid, particularly in the high pressure liquid portion of the fluid circuit of the heat transfer system 10. Thus, the invention can be used to provide control information to the controller 40 that corresponds to refrigerant pressure, saturation temperature, saturation pressure and the amount of subcooling. The invention also conveniently can be used to detect loss of working fluid. According to an important aspect of the invention, the sensor can be realized in a small compact arrangement using inexpensive electronic components. Thus the benefits of a fully electronic system controller can be realized with accuracy, fast response time and low power consumption.

In accordance with the invention then, and in a preferred embodiment thereof, a high side working fluid sensor for a heat transfer system includes a temperature dependent resistance element 50 that preferably is disposed in direct thermal contact with the working fluid. In this configuration, the resistance element 50 is used to locally heat the working fluid. For the exemplary system described herein, the resistance element 50 is positioned in the fluid circuit near the high pressure inlet port of the expansion valve 22. However, this particular location is exemplary only, and those skilled in the art will readily appreciate that the resistance element 50 can be positioned at any location where it is desired to detect characteristics of the working fluid.

The resistance element 50 is preferably realized in the form of a thermistor, such as part no. E15SA1B053 available from Victory Engineering. A thermistor is used because it can be easily monitored by the electronic controller 40, and also because it can conveniently be used to heat locally the working fluid by passing current therethrough, and as a fluid ambient temperature sensor. However, the invention is not limited to the use of a thermistor as the resistance element 50, and other devices such as resistance temperature devices (RTDs), or a temperature sensor in combination with a separate heating element, could be used, just to name a few alternatives.

The heat transfer characteristics to be determined in accordance with the invention is repeatable and readily obtained only when heating a volume of relatively still, non-flowing fluid. Even if a side chamber is provided for the element 50, turbulence in the main flow path will still disturb the fluid in the side chamber. The flow produces "noise" that interferes with the function of the device, the noise tending to increase with flow velocity.

In order to resolve this problem, the thermistor is located in a sensor housing 53, which, in the embodiment shown, is in the form of a cylinder having a relatively small diameter at the outer end and relatively larger diameter at the inner end. The inner end of the housing fits over a tubular portion of a flanged mounting tube 54 which serves to support the housing in a desired position relative to the respective flow passage. A seal ring 55 fits over the inner end of the housing 53 and also rests against the face of the flange.

Fitted against the outer end of the tubular portion of the flanged tube 54, is a seal plate 56 that is retained by the housing and the mounting tube 54. The seal plate 56 has openings that receive conductors 51 that are connected to the electrical leads 51 of the thermistor. The housing 53 and the seal plate 56 define a sensor chamber 57 in which the thermistor is positioned. The housing has an outer end face 58 with an elongated opening or slot 59 formed therein.

The end face 58 is positioned in the flow passage for the refrigerant within, the expansion valve 22. With this arrangement, a volume of fluid is admitted into the chamber 57 and is isolated from the rapidly flowing fluid in the flow passage so that the contained volume is relatively quiescent.

Thus, the volume of fluid in the chamber 57 is not disturbed by turbulence in the main flow path even though the flow velocity in the main flow path is relatively high. The orifice is thus an important feature in those applications where the velocity in the main flow path is high enough to cause a problem.

It has been found that a suitable area for the opening 59 is, for example, 0.0025 in$^2$. The opening may be a circular orifice, however the preferred form is an elongated opening or slot having an equivalent area. The vertical slot prevents the trapping of both liquid and gas in the chamber 57 which allows the sensor 50 to rapidly discriminate between gas and liquid which is one of the functions of the sensor. It will be apparent that by using the elongated slot, gas escapes from the top and liquid at the bottom which is preferable to other arrangements.

The cavity is also preferably located at the bottom of the liquid line to reduce the effects of flash gas. Flash gas can occur under sudden changes in compressor speeds but is typically only a short duration phenomena. However, the high side sensor could mistake flash gas for loss of charge or produce false pressure data. By positioning the element 50 at the bottom of the liquid line, flash gas effects are reduced.

The thermistor 50, of course, includes two electrical leads 52 that are connected to a control circuit 60 that preferably is included as part of the system controller 40. The thermistor leads 52 can be connected to the control circuit 60 via the multiwire cable 22a which, as described above, also includes electrical leads for connecting the expansion valve to the system controller 40. It is important to recognize, however, that the invention does not have to be used as part of an overall refrigeration management controller, and in fact can be used as a separate sensor module. In other words, the control circuit 60 that is used to actuate and monitor the thermistor 50 can be conveniently incorporated into the overall system controller 40, or just as easily be realized as a discrete stand alone circuit or as a separate circuit module connected to the system controller 40.

Figure 2:
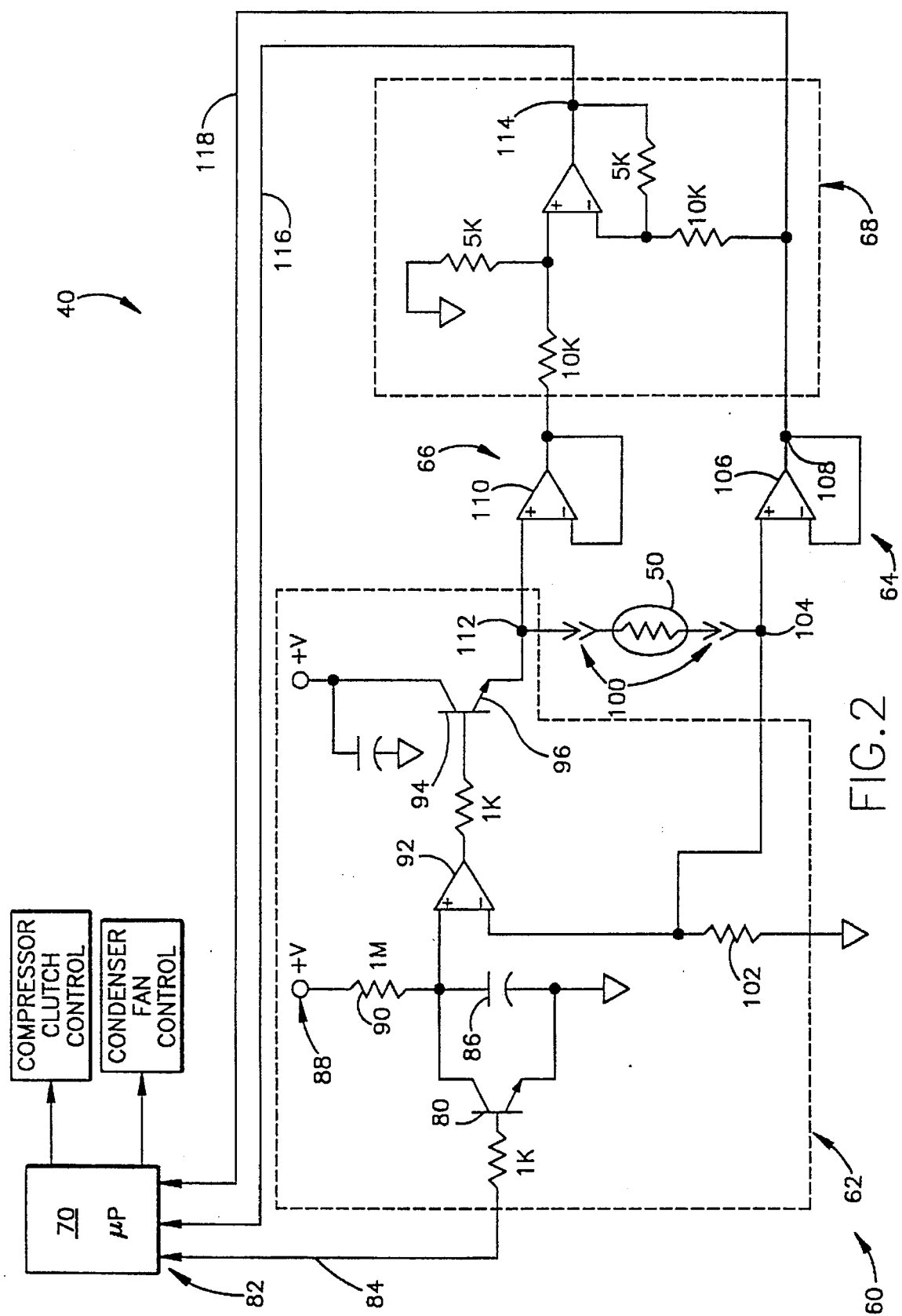
FIG. 2 is a circuit schematic of a preferred control circuit for use with the invention.
Figure 4A:
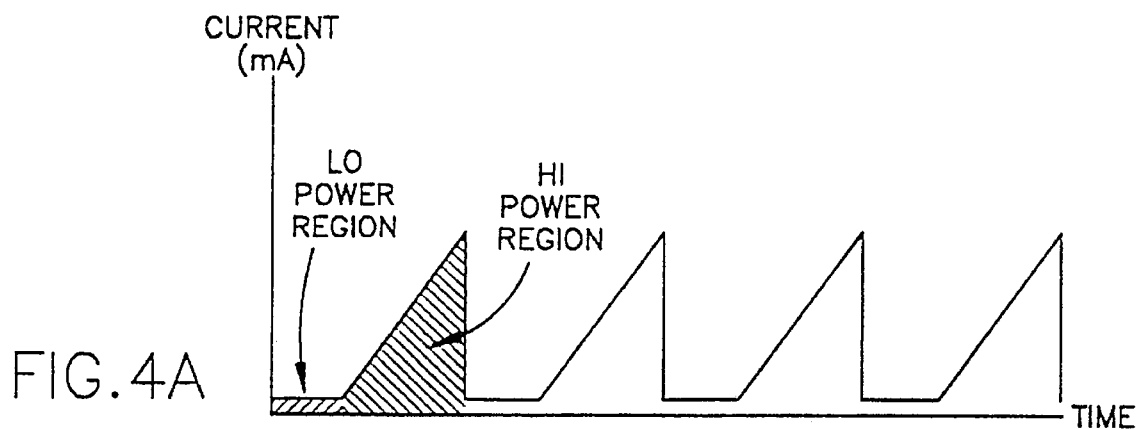
FIGS. 4A–4D are a series of graphs representing various signals and operating conditions that exemplify the principles and operation of the invention.
Figure 4B:
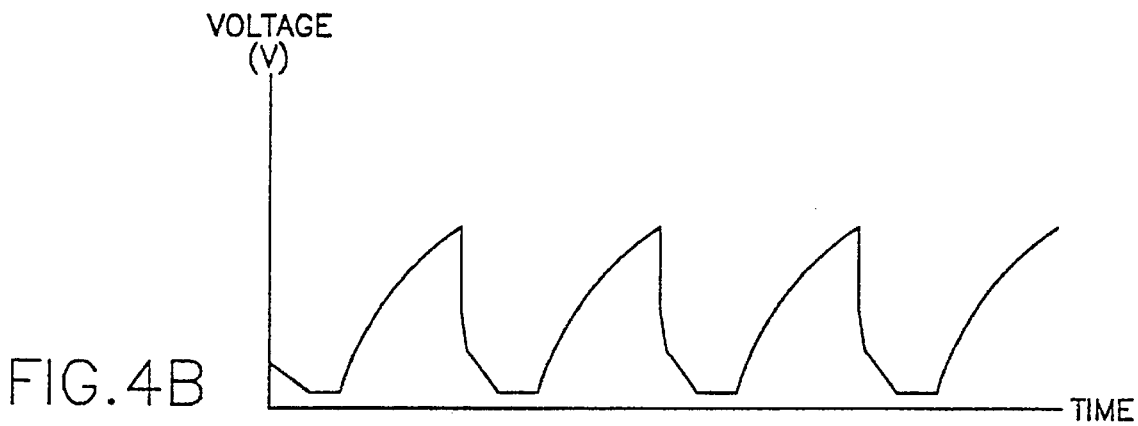
Figure 4C:
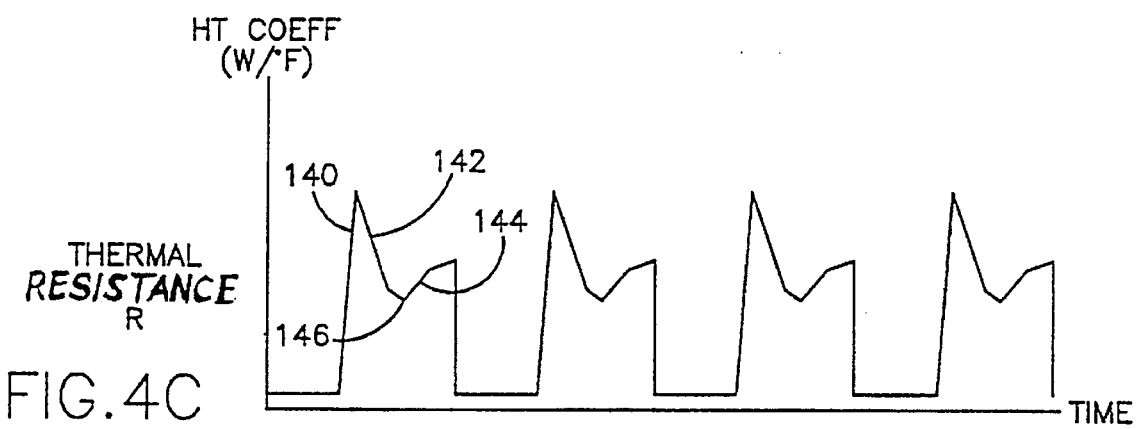
Figure 4D:
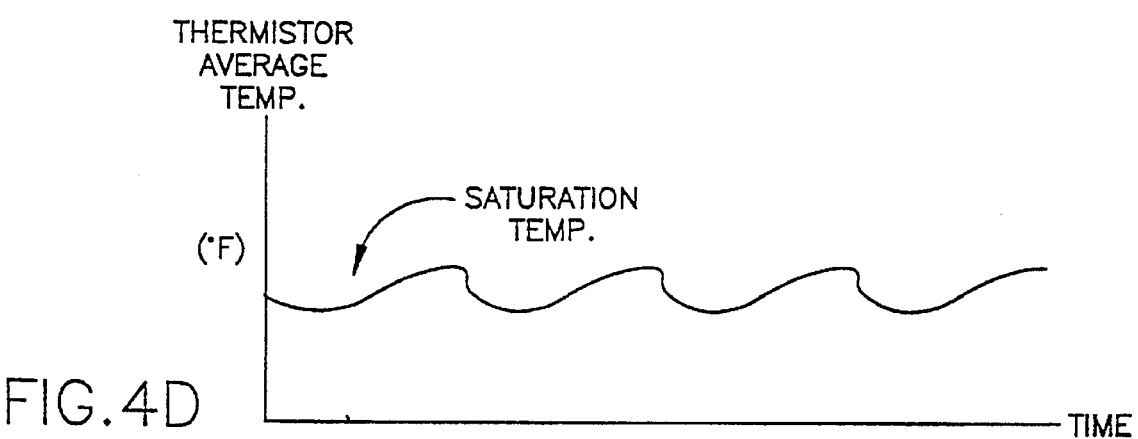
Figure 5:
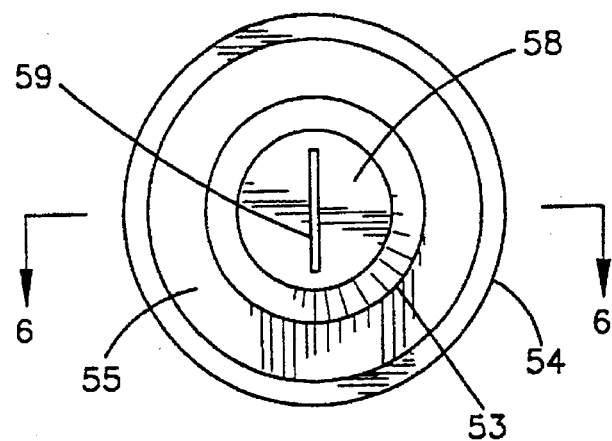
FIG. 5 is an end elevation of the sensor housing in which the temperature dependent resistance is located.
Figure 6:
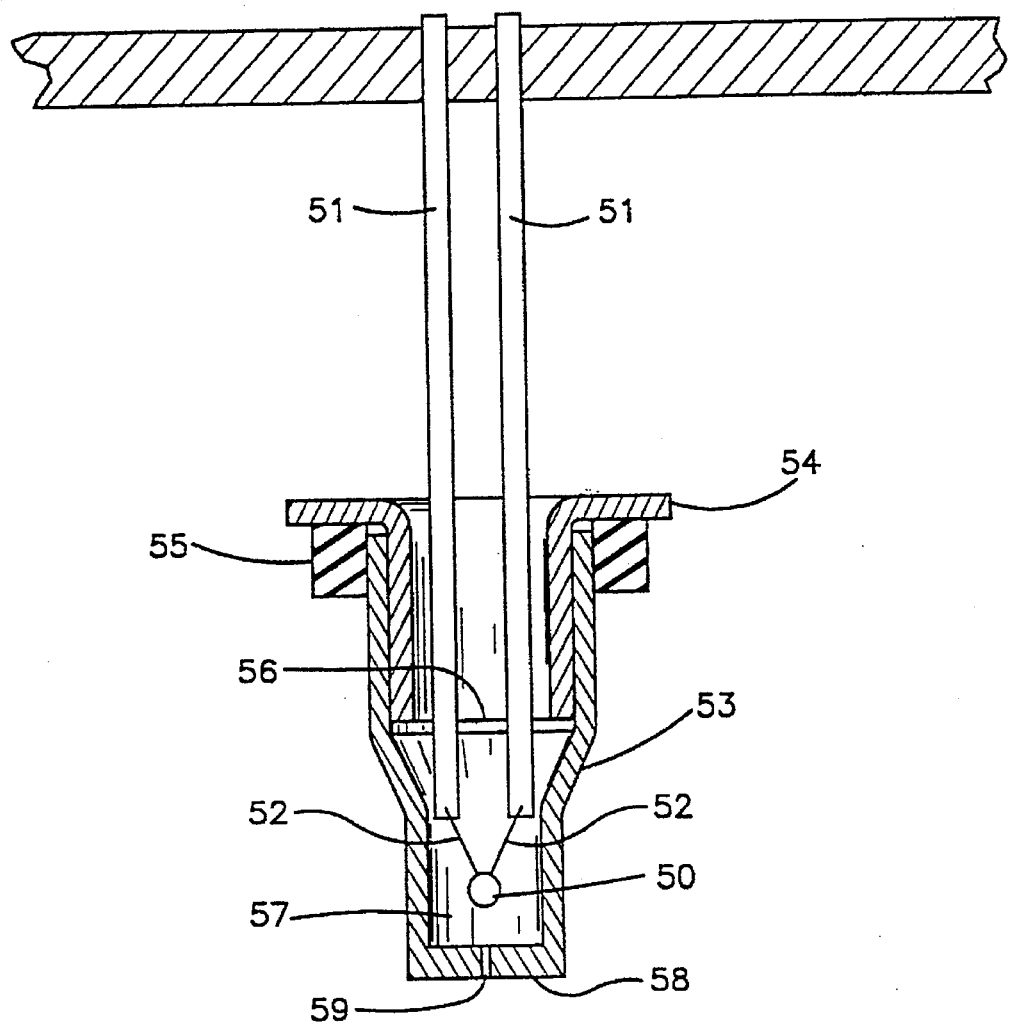
FIG. 6 is a sectional view taken on the line 6—6 of FIG. 5.

With reference now to FIG. 2, we illustrate therein a preferred control circuit 60 used in combination with the thermistor 50 to realize a sensor in accordance with the teachings of the present invention. The control circuit 60 is a preferably a subcircuit of the overall heat transfer system controller 40, and includes a time varying current source 62, a current level detector 64, a voltage level detector 66, a differencing or subtraction circuit 68, and a control device 70. While the control device is preferably realized in the form of a microprocessor that also serves as the overall system controller, this is simply for convenience. The control circuit used to realize the present invention can be practiced as a discrete control circuit, with or without the use of a microprocessor, as will be readily apparent to those skilled in the art.

The current source 62 has several functions. During a first predetermined time period the current source supplies a low level current to the thermistor 50. During this low power period, self-heating is negligible and the thermistor 50 is used to detect the temperature of the working fluid. During a second predetermined time period, the current source provides a time varying current to the thermistor 50 to gradually cause the thermistor to self-heat and thus locally heat the working fluid. The current signal through the thermistor may be considered a current control signal for the electrical resistance element 50 because the current determines or controls the self-heating and temperature sensing states of the thermistor.

The current source 62 includes a switching transistor 80 that has its base terminal connected to an output 82 of the microprocessor 70. At programmed time intervals, the microprocessor 70 applies a control signal to the switching transistor 80 via signal line 84. In the preferred embodiment, this control signal is a binary signal that causes the transistor 80 to turn on when the control signal is logic high, and to turn the transistor 80 off when the control signal is logic low. A timing capacitor 86 is connected between the transistor 80 collector and emitter terminals such that when the transistor is on the capacitor is discharged, and when the transistor is off the capacitor is charged by current from a power supply 88 through a timing resistor 90.

The timing capacitor 86 is connected to an amplifier 92 that produces an output voltage related to the voltage on the capacitor 86. The amplifier 92 drives a current source transistor 94 operating in the active region. The higher the output voltage from the amplifier 92, the greater the current sourced through the transistor 94 emitter output. The current source transistor emitter 96 is connected in series with the thermistor 50. This can be conveniently accomplished through a connector 100 and the multiwire cable 22a described hereinbefore. The return conductor for the thermistor 50 is connected in series with a current sensing resistor 102 which in turn is connected between ground and the amplifier 92 as one of the differential inputs. The junction node 104 that connects the thermistor 50 to the current sensing resistor 102 is further connected to an input of the current detector 64. The current detector 64 is an amplifier 106 configured as a voltage follower. Thus, the output 108 of the current detector 64 is a voltage that corresponds to the voltage drop across the current sensing resistor 102 caused by current through the thermistor 50. The output 108 of the current detector amplifier 106 is used as an input to the subtraction circuit 68. The other input to the subtraction circuit 68 is provided the voltage detector 66.

The voltage detector 66 is an amplifier 110 configured as a voltage follower. The junction node 112 that connects the current source emitter 96 to the thermistor 50 is also connected to the voltage detector amplifier 110 input. Thus, the voltage detector 66 produces an output that corresponds to the voltage at the junction node 112.

The subtraction circuit 68 is realized in a conventional manner well known to those skilled in the art. The subtractor circuit 68 functions to produce an output at node 114 that represents the difference between the output voltage from the current detector 64 and the output voltage from the voltage detector 66. However, these two voltages simply represent the voltage drop across the thermistor 50. Thus, the subtractor output 114 corresponds to the voltage drop across the thermistor 50. Also, the output signal 108 from the current detector 64 corresponds to the current control signal through the thermistor 50. As shown in FIG. 2, both of these output signals (the subtractor 68 output and the current detector 64 output) are connected as inputs to the microprocessor 70 on signal lines 116 and 118 respectively. The microprocessor can use these signals to easily calculate the resistance of the thermistor because the voltage and current parameters are known.

Those skilled in the art will readily appreciate that the current sense resistor 102 is used primarily as part of the current source circuit 62. Use of the voltage drop across this resistor as part of the subtraction circuit 68 is merely for convenience, because the voltage wave form across the resistor 102 is always the same. This is because the current through the thermistor 50 is the same every cycle due to operation of the current source. Thus, as an alternative embodiment, the microprocessor can be arranged to simply detect the voltage at the node 112 and determine the thermistor resistance therefrom because the thermistor current vs. time function is also known and is a predetermined function.

Operation of the control circuit 60 will be best understood in view of FIG. 2 as well as FIG. 3. The microprocessor 70 is programmed in a conventional well-known manner to produce an output control signal 120 on signal line 84 at appropriate times and intervals. As shown in FIG. 3, the control signal has two discrete states, high and low. During each time period, such as period 122, when the control signal 120 is high, the switching transistor 80 is turned on and the timing capacitor 86 is shorted. The amplifier 92 and current source transistor 94 circuit are appropriately biased so that during the time period 122 a very low level current 124 is sourced through the thermistor 50. This low current time period 122 can thus be used to sense the temperature of the working fluid because the thermistor 50 does not appreciably self-heat. During each time period when the control signal 120 is logic low, such as time period 126, the switching transistor 80 is turned off and the timing capacitor 86 charges at a rate determined by the RC time constant defined by the capacitor and the timing resistor 90. Due to the relatively long charging time periods, the capacitor 86 charging curve closely approximates a linear charge. The capacitor 86 time varying voltage is conditioned by the amplifier 92 and thus produces a generally linear time varying current 128 through the thermistor 50. This current control signal causes the thermistor to gradually self-heat which in turn causes localized heating of the working fluid. In a typical system, the low level sensing current 124 may be on the order of 8 to 20 milliamps and the self-heating current may be ramped up to, for example, 300 milliamps. The time periods 122 and 126 may be selected to be of any convenient duration. Two seconds for the temperature sensing period 122 has been found suitable, while a time period from 2 to 8 seconds for the current ramp time has been found suitable. These time periods are not critical, however, and the microprocessor 70 can be programmed to vary these times as desired.

With reference now to FIGS. 4A–4D, an important aspect of the invention is that the control circuit 60 is used to determine the thermal resistance between the thermistor 50 and the working fluid as the thermistor is self-heated. This thermal resistance is defined as the ratio of the power dissipated by the thermistor 50 divided by the difference between the thermistor temperature and the bulk temperature of the working fluid. In equation form, the thermal resistance in watts per F° is calculated as follows:

$$\mathbb{R}=P/(T-T_f)$$ Eq. 1 where P is the calculated power dissipated by the thermistor, T is the temperature of the working fluid locally heated by the thermistor, and $T_f$ is the bulk temperature of the working fluid.

The value $T_f$ is easily determined from the thermistor value during the low current period 122. The low current level does not appreciably self-heat the thermistor 50, therefore, the thermistor resistance value corresponds to the temperature of the working fluid, as is well known. The resistance value of the thermistor during the low current period (or low power period as noted on FIGS. 4A–4D can be calculated from the output signals of the current detector 64 and subtractor 68. The output of the detector 64 represents the current through the thermistor and the output of the subtractor circuit 68 represents the voltage drop across the thermistor. Thus, a simple ratio of these signals produces a value that corresponds to the resistance of the thermistor which in turn corresponds to the value $T_f$.

During the time-varying current period 126, however, the thermistor self-heats and dissipates power in the form of heat. This heat dissipation locally raises the temperature of the working fluid in a region proximate the thermistor. This time period is labelled High Power Region in FIGS. 4A–4D. Graph A represents the ramped current supplied to the thermistor 50, and graph B represents the corresponding voltage waveform across the thermistor. As expected, the voltage drop across the thermistor closely follows the current through the thermistor.

Graph C, however, illustrates how the thermal resistance between the thermistor 50 and the working fluid changes during the self-heating period. Initially, as at 140, the thermal resistance rises dramatically. However, as the local fluid temperature increases substantially, the heating efficiency improves and less power is needed to be dissipated in order to keep raising the temperature of the fluid, as at 142. The negative slope of the thermal resistance graph indicates that heat transfer from the thermistor to the fluid becomes more efficient as the temperature of the fluid is locally increased. However, as the thermistor temperature is raised even higher, the heat transfer efficiency once again changes, as at 144, such that this change in thermal resistance back to a positive slope produces a local minimum thermal resistance indicated at 146. This local minimum 146 is a repeatable and predictable event that correlates well with the saturation temperature and actual pressure of the working fluid. The local minimum thermal resistance does not occur at the boiling point of the working fluid, but can be accurately correlated to the saturation temperature and pressure. Thus, by detecting the local minimum thermal resistance between the thermistor 50 and the working fluid, accurate data can be obtained that corresponds to pressure characteristics of the fluid without the need to use a pressure transducer. In graph D we show how the average measured temperature of the thermistor changes with time as the current varies as in graph A. The dotted lines on graph D identifies the average thermistor temperature at the thermal resistance local minimum point (point 146 in graph C). Those skilled in the art will readily appreciate that the thermal resistance corresponds directly to the thermal conductance. Thus, in a general sense, the invention contemplates the use of a heat transfer characteristic between the sensor and the refrigerant as a control parameter for the system.

The control circuit 60 detects the local minimum thermal resistance. The microprocessor 70 triggers the time varying current to pass through the thermistor as explained hereinbefore. As the current increases, the microprocessor periodically samples the outputs from the subtractor 68 and the current detector 64. These values are used to calculate the thermistor resistance value. The power dissipated can be calculated as, for example, the product of the voltage and current across the thermistor. Alternatively, the power dissipated can be calculated as the square of the current times the thermistor resistance. Other convenient calculations could also be used. The resistance of the thermistor at each sample point corresponds to the value T in Eq. 1, of course. Therefore, at each sample point the microprocessor can store values for each of the values needed to compute Equation 1. The microprocessor then calculates the various thermal resistance values and detects the local minimum from that set of readings. When the minimum is detected, the thermistor value that occurred at that point corresponds to the pressure of the fluid. This data can then be used as part of the microprocessor control function of the compressor, condenser fan and so on.

In addition to detecting characteristics of the working fluid, the invention can be used to detect loss of refrigerant from the fluid circuit. As the current is increased to the thermistor 50, the temperature of the fluid locally increases. In the event of failure to detect a local minimum thermal resistance, or if the fluid temperature exceeds a predetermined threshold, loss of refrigerant is indicated, or excessive subcooling of the refrigerant may exist. For example, the difference between the temperature at which the local minimum occurs and the bulk temperature of the fluid is a direct indication of the degree of cooling of the working fluid below the saturation temperature. If excessive subcooling is present, the local minimum may not be detectable during the programmed time period 146, or the difference in temperature can be used to regulate operation of the system components. If the local minimum thermal resistance is not detected, loss of charge can be detected by determining the average rate of temperature rise during the self-heat mode of operation. The formula $(T_{max}-T_o)/(t_{max}-t_o)$ can be used to calculate the average rate of temperature rise during the current ramp period, wherein $T_{max}$ is the maximum thermistor temperature reached during the current ramp time, $T_o$ is the bulk refrigerant temperature during the low power mode, $t_{max}$ is the time when the current ramp ended and $t_o$ is the time the ramp began. An undetected local minimum thermal resistance usually indicates gas, not excessive subcooling. If the temperature rise rate exceeds a predetermined value, such as 1.2 degrees/sec, for example, this confirms loss of charge rather than excessive subcooling, because high rates of temperature rise substantiate the presence of gas.

While the control circuit has been described with respect to a specific embodiment thereof, the functions of the circuit can be realized in many different embodiments. For example, typical component values have been provided in FIG. 2, but these are merely exemplary. The graphs of FIGS. 4A–4D also are intended to represent typical relationships that could be found in a representative system. In addition, a linear ramped current through the thermistor is not required. The current should increase in a time varying manner so as to gradually heat the working fluid at a rate appropriate to allow the minimum thermal resistance to be detected. Although FIGS. 3 and 4A–4D depict repeating waveforms, particularly for the control signal 120 and the current to the thermistor, such cyclical signals are not required. A single cycle of the low and high power intervals can produce enough data points to detect the minimum, thermal resistance. Preferably, the thermistor is positioned to maximize localized heat transfer between the thermistor and the working fluid. Thus, the invention provides apparatus and methods for detecting characteristics of a working fluid in a heat transfer system that is controlled electronically and can accurately detect such characteristics without the need for mechanical or electromechanical pressure sensors, transducers, or the need to measure boiling temperature.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. In a heat transfer system of the type having a fluid circuit comprising a compressor for pressurizing a working fluid received from an evaporator, a condenser for cooling working fluid received from the compressor, and an expansion valve for controlling flow of the working fluid in a flow passage between the condenser and the evaporator, the improvement comprising;

a working fluid sensor, said sensor comprising a temperature dependent resistance means, a sensor housing located between the condenser and the valve and defining a chamber containing said resistance means, means defining a small opening communicating between said flow passage and said chamber to admit a volume of working fluid to said chamber, said resistance means thereby being in heat exchange relationship with the volume of working fluid so as to locally heat the fluid in response to a control signal applied thereto; and control means for applying said control signal to said resistance means and for determining a minimum thermal resistance between said resistance means and the working fluid.

2. The system according to claim 1 wherein said resistance means is a thermistor.

3. The system of claim 1 wherein said control means applies a time varying current control signal to said resistance means such that said resistance means temperature gradually increases beyond the working fluid boiling temperature.

4. The system of claim 3 wherein said time varying current includes a period of time during which a low level current is applied to said resistance means in order to measure the working fluid temperature and another period of time during which a linearly changing current is applied to said resistance means to cause self-heating of said resistance means.

5. The system of claim 4 wherein said control means uses said minimum thermal resistance data to detect loss of refrigerant.

6. The system of claim 4 wherein said control means comprises a time varying current source in series with said resistance means and means for determining resistance of said resistance means as current through said resistance means is changed.

7. The system of claim 6 wherein said determining means further determines thermal resistance of said resistance means according to the following function:

$$R = P/(T - T_f)$$

where R represents the thermal resistance, P is the calculated power dissipated by said resistance means, $T_f$ is the working fluid temperature at said low current level, and T is the temperature of said resistance means at each sampled current value during said another time period.

8. The system of claim 1 wherein said minimum thermal resistance is used as a control criteria by said control means for operating the compressor.

9. The system of claim 1 wherein said small opening comprises an elongated slot.

10. The system of claim 1 wherein the area of said opening is about 0.0025 in$^2$.

11. A method for detecting characteristics of a working fluid moving through a flow passage comprising the steps of:
   admitting a volume of said working fluid to a chamber through a small opening communicating between said chamber and said flow passage,
   disposing a temperature dependent resistance in said chamber so as to be in heat transfer relationship with the fluid of said volume,
   applying a time varying control signal to said resistance sufficient to cause localized heating of the fluid, and
   detecting thermal resistance between said resistance and the fluid by detecting power dissipated by said resistance as the fluid is heated.

12. Apparatus for determining characteristics of a working fluid comprising a sensor positionable in the fluid for causing localized heating of the fluid in response to a control signal, and control means for generating said control signal and for determining a heat transfer characteristic between the sensor and the liquid, said control means determining said heat transfer characteristic based on energy dissipated by said sensor.

13. The apparatus of claim 12 wherein said heat transfer characteristic is a local minimum thermal resistance related to the boiling point of the fluid.

14. The apparatus of claim 12 wherein said heat transfer characteristic is thermal resistance between the sensor and the fluid.

15. The apparatus of claim 12 in combination with a heat transfer system of the type having a fluid circuit interconnecting compressor means, condenser means, expansion means and evaporator means, wherein said heat transfer characteristic is used as a control parameter for the heat transfer system.

16. The apparatus of claim 15 wherein said sensor is disposed on the high pressure side of the expansion means and is used to detect a pressure related characteristic of the fluid.

17. The apparatus of claim 15 wherein said sensor is disposed on the low pressure side of the evaporator means and is used to detect quality/superheat of the fluid.

18. A method for detecting characteristics of a working fluid comprising the steps of disposing a sensor in heat transfer with the fluid, applying a time varying control signal to said sensor sufficient to cause localized heating of the fluid, and detecting a heat transfer characteristic between the sensor and the fluid.

19. The method of claim 18 wherein the step of detecting a heat transfer characteristic includes the step of determining energy dissipated by the sensor.

20. Apparatus for detecting loss of fluid in a heat transfer system of the type having compressor means, condenser means, expansion means and evaporator means interconnected by a fluid circuit, comprising: a sensor disposed in heat transfer with the fluid; and control means for applying a control signal to the sensor to cause localized heating of the fluid and for determining a heat transfer characteristic between the sensor and the fluid based on energy dissipated by the sensor; said control means detecting loss of charge based on said detected heat transfer characteristic.

21. The apparatus of claim 20 wherein said control means determines a local minimum thermal resistance between the sensor and the fluid, and detects loss of charge based on failure to detect said local minimum.

22. The apparatus of claim 21 wherein said sensor comprises a thermistor and said control means gradually increases current through the thermistor to cause localized heating of the fluid, said control means determining loss of charge based on the time rate of change of the thermistor temperature.

23. Apparatus for determining characteristics of a working fluid comprising,
   a housing defining a chamber containing a first fluid portion of a volume of the working fluid,
   means defining a small opening communicating between said chamber and a second fluid portion of said volume.
   a sensor positioned in said chamber for causing localized heating of the first fluid portion in response to a control signal, and
   control means for generating said control signal and determining a heat transfer characteristic between the sensor and the fluid.

24. The apparatus of claim 23 wherein said small opening comprises an elongated slot.

25. The apparatus of claim 24 wherein the area of said opening is about 0.0025 in$^2$.

26. A method for detecting characteristics of a working fluid comprising the steps of;
   disposing a sensor in a chamber containing a first fluid portion of a volume of the working fluid, there being a small opening communicating between said chamber and a second fluid portion of said volume, whereby said sensor is in heat transfer relation with the first fluid portion,
   applying a time varying control signal to said sensor sufficient to cause localized heating of the first fluid portion; and
   detecting a heat transfer characteristic between the sensor and the fluid.

27. A method as defined in claim 26 wherein said small opening comprises an elongated slot.

28. A method as defined in claim 27 wherein the area of said opening is about 0.0025 in$^2$.

* * * * *